(12) United States Patent
Nogima et al.

(10) Patent No.: US 7,269,836 B2
(45) Date of Patent: Sep. 11, 2007

(54) SYSTEM AND METHOD FOR PROVIDING MULTIPLEXING AND REMULTIPLEXING OF MPEG-2 STREAMS

(75) Inventors: Julio Nogima, White Plains, NY (US); Frank A. Schaffa, Hartsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 767 days.

(21) Appl. No.: 10/395,936

(22) Filed: Mar. 24, 2003

(65) Prior Publication Data
US 2004/0190515 A1    Sep. 30, 2004

(51) Int. Cl.
*H04N 7/10* (2006.01)
*H04N 7/025* (2006.01)
*H04J 3/24* (2006.01)
*H04J 3/04* (2006.01)
*H04J 3/02* (2006.01)

(52) U.S. Cl. .................. 725/32; 725/34; 370/474; 370/535; 370/537

(58) Field of Classification Search ............ 725/32–36; 370/474, 535–541
See application file for complete search history.

(56) References Cited

U.S. PATENT DOCUMENTS

| | | | | |
|---|---|---|---|---|
| 5,007,070 A | * | 4/1991 | Chao et al. .................. 375/371 |
| 5,566,174 A | * | 10/1996 | Sato et al. ................... 370/468 |
| 5,600,573 A | * | 2/1997 | Hendricks et al. .......... 725/109 |
| 5,650,825 A | * | 7/1997 | Naimpally et al. ......... 348/465 |
| 5,652,615 A | * | 7/1997 | Bryant et al. .................. 725/35 |
| 6,002,687 A | * | 12/1999 | Magee et al. ................ 370/394 |
| 6,233,255 B1 | * | 5/2001 | Kato et al. ................... 370/486 |
| 6,345,122 B1 | * | 2/2002 | Yamato et al. .............. 382/232 |
| 6,351,471 B1 | * | 2/2002 | Robinett et al. ............. 370/468 |
| 6,421,359 B1 | * | 7/2002 | Bennett et al. ............. 370/538 |
| 6,738,978 B1 | * | 5/2004 | Hendricks et al. ............ 725/35 |
| 6,831,892 B2 | * | 12/2004 | Robinett et al. ............. 370/232 |
| 2002/0064189 A1 | * | 5/2002 | Coupe et al. ............... 370/537 |
| 2002/0144260 A1 | * | 10/2002 | Devara ........................ 725/32 |
| 2003/0174837 A1 | * | 9/2003 | Candelore et al. .......... 380/210 |

* cited by examiner

*Primary Examiner*—Scott E. Beliveau
*Assistant Examiner*—Michael Van Handel
(74) *Attorney, Agent, or Firm*—Anne Vachon Dougherty

(57) ABSTRACT

A system and method for multiplexing and remultiplexing whereby multiplexed programs from an input stream are only demultiplexed if they are to be copied or modified locally. Any multiplexed programs which are part of an input stream and which are intended to be part of the output stream are not demultiplexed but are simply passed along to be added to the transport stream with other multiplexed programs. A further inventive aspect comprises a multiplexer apparatus and process whereby dynamic bit rate adjustment is applied to eliminate the need to recalculate timebase information for altered streams.

23 Claims, 6 Drawing Sheets

SYSTEM AND METHOD FOR PROVIDING MULTIPLEXING AND REMULTIPLEXING OF MPEG-2 STREAMS

FIELD OF THE INVENTION

This invention relates generally to the delivery of media streams to remote locations and more particularly to remultiplexing multiple programs into MPEG-2 transport streams for delivery to requesting locations.

BACKGROUND OF THE INVENTION

When providing programs to requesting client locations (for example, viewer's television sets), an MPEG transport stream is created. An MPEG-2 transport stream, comprising packets of 188 bytes, combines one or more programs, with common or independent timebases, into a single stream. The input program streams, which may be combined into the transport stream, can have a constant bit rate (CBR) or a variable bit rate (VBR), wherein a CBR stream has a known bit rate associated with the stream, while a VBR stream has no specified bit rate. MPEG-2 transport streams can be delivered via cable, satellite or air from a program provider location to a viewer location.

A transport stream carrying more than one program is referred to as a Multi-Program Transport Stream (MPTS). A transport stream multiplexer is a device that combines multiple programs to form a single transport stream. In doing so, the multiplexer must guarantee the integrity and accuracy of the individual timebases of the programs, since the correct timebase is necessary for the decoding of each individual program at the receiving location. The process of extracting the individual program streams from the transport stream is done by a demultiplexer.

FIG. 1 provides a block diagram of an environment wherein the multiplexing and demultiplexing occurs. A requesting client, viewer location 100, "requests" a program, either by simply tuning to a designated program display channel on a set top box or by entering a so-called "pay per view" request which will be sent via its communications component 102 to server 1 at 110. Server 1 may be a cable provider's headend, or other comparable program servicing facility. If server 1 has a copy of the program in its storage location 118, the program will be accessed, multiplexed into a stream at multiplexer 116, and provided via communications component 112 to the client. Should more than one program be requested, and both be available at server 1, the created stream will be an MPTS that is provided to client location 100 for demultiplexing at demultiplexer 104 and then provided for viewing at display 103 (e.g., a computer or television set). If server 1 does not have a copy of a requested program in its storage 118, it will communicate with another server, shown as server 2 at 120, to obtain a copy. Upon receipt of a request at the communications component 122 of server 2, a copy of the requested program is retrieved from storage 128, multiplexed in multiplexer 126 into an MPEG-2 stream, and then provided to communications component 122 for transmission to server 1. Server 1 must then demultiplex the stream received from server 2 at its demultiplexer 114, followed by remultiplexing the stream, for example with a program accessed from local storage 118, to provide an MPTS for transmission from communications component 112 to the client 100.

A remultiplexer is a component, illustrated at 115 in FIG. 1, which performs both the demultiplexing and multiplexing functions. FIG. 2 illustrates in greater detail a prior art remultiplexer 215 having both demultiplexing and multiplexing capabilities. Upon receipt of an input transport stream, at buffer 202, requested program or programs are extracted from the input stream, demultiplexed at demultiplexer (DEMUX) 204 and then provided to individual program buffers, 206, 216 and 226. A decision is made at the program buffers if the buffered program should be added to the output stream, copied into storage, or dropped. The decision is generally based on the contractual arrangement previously entered into by the viewer and the program provider. For those programs which are to be passed to the output stream, the demultiplexed programs, as well as any programs which are being inserted from local storage, are provided to the multiplexer (MUX) 208 which multiplexes the programs into the output transport stream and provides them to output buffer 210 for streaming in accordance with known techniques. A bypass switch 201 is provided to allow streams to pass through the provider location in the event of scheduled maintenance on or a failure of the remultiplexer.

Conducting both demultiplexing and multiplexing at the remultiplexer is costly in terms of time and program integrity. Both demultiplexing and multiplexing can introduce sources of error into the streams unless care is taken to ensure that timebase information is correctly applied. Program streams carry timebase information in packets having Program Clock Reference (PCR) timestamps, which are included at least every 100 mS. However, if the original program is changed, for example at buffer 202 or at program buffer 206, 216 or 226, by adding or removing packets before the multiplexing process, as further discussed below, the timebase information on the original program may become inaccurate and may compromise the decoding/demultiplexing process. The timebase information on the entire program would need to be adjusted before multiplexing it, which introduces both cost and delay in the remultiplexer.

Adding packets may be necessary if one wants to encrypt some elements of a program, to add watermarks, to insert tracking information before transmission, or to insert functions such as closed captioning, electronic program guides, or data for interactive services. Removal of packets may be done to remove partial information of a program (like an audio channel). Other packets which would frequently be added to a transport stream include packets not referenced in the PSI tables (unreferenced packets) such as packets containing DVB and ATSC information.

Every packet in a transport stream contains an ID (hereinafter referred to as "PTD"). A program is defined by a set of PIDs. A special PID (0x1fff) identifies the idle packet PID that is used as padding in a transport stream. However, in an MPTS transport stream there is no guaranteed way to determine if an idle packet belongs to a program or is a padding packet (which is the result of a multiplexing process). A transport stream includes tables (PSI tables), which identify the number of programs carried by the transport stream and which list the PIDs of each program. The transport stream may additionally include the aforementioned unreferenced packets, such as DVB and ATSC specific packets which are not referenced in the tables. During the demultiplexing process, the unreferenced packets are typically sent to a separate buffer, 226 of FIG. 2, and then reinserted into the output transport stream by the multiplexer MUX 208. However, the original bit rate of the unreferenced packets cannot be determined. This ambiguity, along with the idle packet problem, creates a potential, if not a likelihood, that timing information of the original stream will be compromised. Prior art systems, therefore, can transform an original CBR program before the multiplexing process into a VBR program after the demultiplexing. If the extracted program is to be further multiplexed (e.g., a program provided from server 2 which will be further multiplexed at server 1 for transmission to the client), it will potentially require a conversion from VBR to CBR stream. The demultiplexed program can, however, only be reconstructed to its original CBR form if the original bit rate is known. However, an MPTS does not carry information about the bit rates of the programs that it contains. That original bit rate information has to be supplied to a demultiplexer by another means (e.g., a software application).

One difficulty encountered in the remultiplexing of VBR streams is that there may not be sufficient instantaneous bandwidth to transmit all of the requested streams. The bandwidth profile of each stream can be adjusted to guarantee that they all fit in the output channel. However, this adjustment requires real-time processing of the streams before multiplexing, which is a very processing intensive task and can add significant delays.

What is needed, and what is an object of the present invention, is a system and method to allow remultiplexing of CBR and VBR streams without pre-processing or demultiplexing programs.

Another object of the present invention is to provide a system and method that allows multiplexing of programs that have been partially changed, without the need for adjusting the timebase information.

Yet another object of the present invention is to insert a remultiplexer into an already active MPEG-2 transport stream path with minimal disruption.

SUMMARY OF THE INVENTION

The foregoing and other objects are realized by the present invention comprising a remultiplexer and remultiplexer process whereby multiplexed programs from an input stream are only demultiplexed if they are to be stored or modified locally. Any multiplexed programs which are part of an input stream and which are intended to be part of the output stream are not demultiplexed but are simply passed along to be added to the transport stream with other multiplexed programs. A further inventive aspect comprises a multiplexer apparatus and process whereby dynamic bit rate adjustment is applied to eliminate the need to recalculate timebase information for altered streams.

BRIEF DESCRIPTION OF THE DRAWINGS

The invention will now be described in greater detail with specific reference to the appended figures wherein.

DETAILED DESCRIPTION OF THE INVENTION

Figure 3:
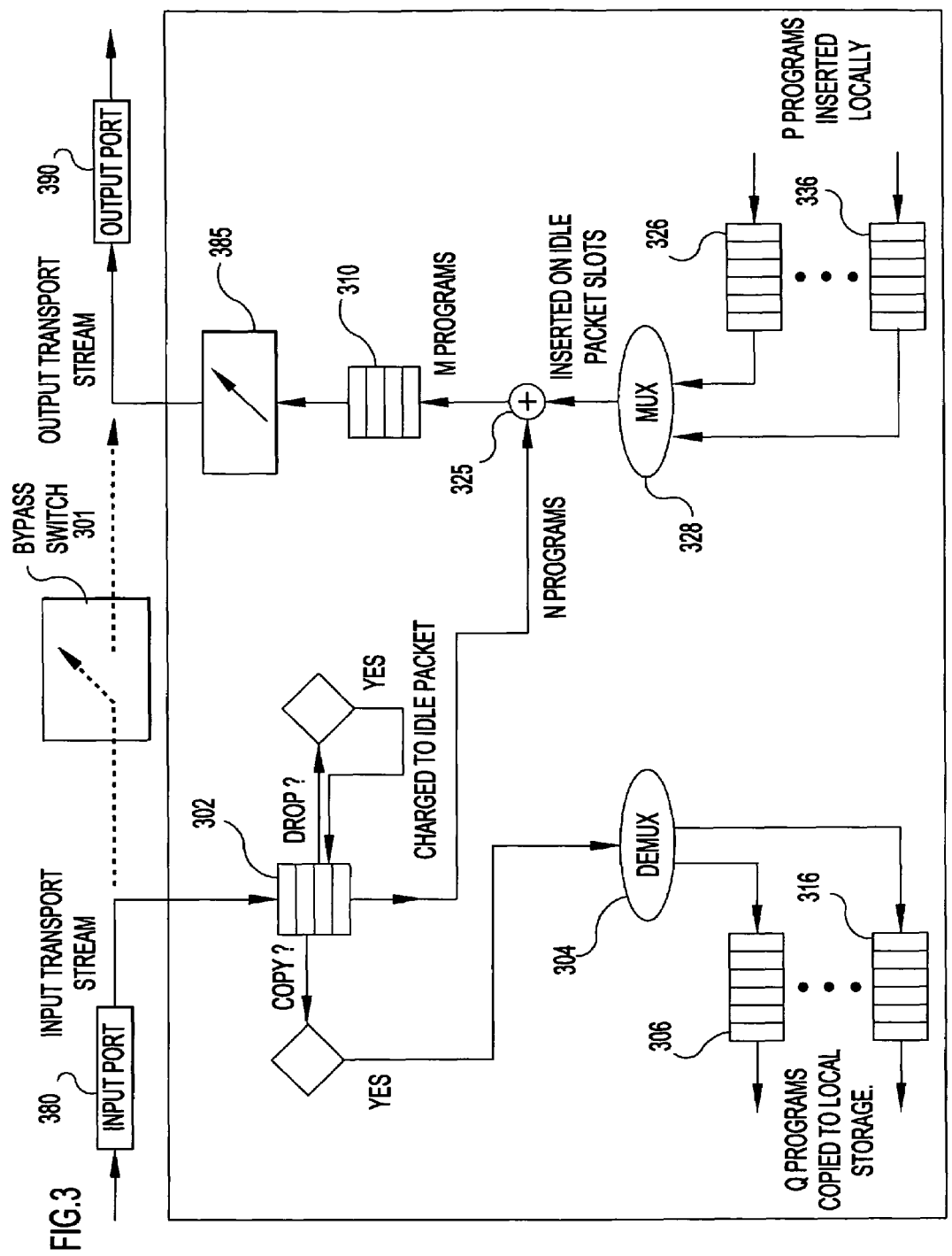
FIG. 3 provides a schematic diagram of a remultiplexer in accordance with a first aspect of the present invention.

The inventive remultiplexer of FIG. 3 realizes the stated objectives of providing fast program insertion time, low latency, and preservation of timing information. As illustrated in FIG. 3, the remultiplexer 315 receives the input stream into input buffer 302. At input buffer 302, a decision is made as to whether each of the program components of the input stream is to be passed to the output stream, copied, or dropped. The buffer logic looks at the PID for each program component and makes the determination, upon consultation with tables or other indicia stored for a particular viewer, that indicia indicating the contractual arrangement that the viewer has with the program provider. For example, a viewer may not require a secondary audio program component which provides Spanish language audio. Accordingly, that program component would not be passed for inclusion in the output transport stream.

When a decision is made to pass a program component to the output stream, that program component passes to combiner 325 unchanged. Should it be determined that any program components in the input transport stream are be removed from the stream, the packet locations of packets for those program components are not dropped from the transport stream. Rather, the packet locations are changed to idle packets, preferably by changing the PID for the packet, which requires less processing time than physical replacement of the content of the relevant packets. In this way, the timing information for the original input transport stream remains unchanged. The resulting stream, comprising packets for program components which are to be passed to the output transport stream and packets marked as idle packets, is provided to combiner 325, at which the program stream from input buffer 302 is combined with the program stream from the multiplexer MUX 328. MUX 328 multiplexes programs which are being inserted locally, for example from local storage via program buffers 326 and 336. It is to be noted that the locally inserted programs may be program components which have been removed from the input stream at input program buffer 302, demultiplexed at DEMUX 304, altered (e.g., for removal of a secondary audio component), and then provided for multiplexing at multiplexer 328. When combining the locally inserted program stream from MUX 328 with the program stream from the input buffer 302, the packets of the program stream from MUX 328 can readily be inserted in place of the idle packets of the program stream from the input buffer. At this point, clearly, the packet contents are being replaced as well as the PIDs being changed or remapped. The details of remapping can be found in the co-pending patent application entitled "METHOD AND APPARATUS FOR MPEG-2 PROGRAM ID RE-MAPPING FOR MULTIPLEXING SEVERAL PROGRAMS INTO A SINGLE TRANSPORT STREAM" (YOR919990416 filed Nov. 23, 1999, the teachings of which are hereby incorporated by reference. Once the program streams have been combined, the output transport stream is provided to output buffer 310 for transmission.

When the input buffer logic determines that a program component from the input transport stream is to be removed from the input transport stream, as noted above, the packet locations previously occupied by packets from those program components to be removed are marked as idle but are not physically removed from the transport stream, thereby ensuring that the timing information contained within the transport stream is accurate. The content of packets from program components which are to be dropped is not further processed. In contrast, the content of program components which are to be stored or altered for the output stream is maintained by copying the program stream and providing that stream to the demultiplexer, DEMUX 304. The program components are demultiplexed at DEMUX 304 and sent to program buffers 306 and 316 from which they are copied into local storage when they are to be stored or into program buffers, such as 326 and 336, when they are to be altered for the output stream.

By maintaining the timebase information for the input transport stream, the present invention greatly enhances the response time at a program provider location, such as a headend. No additional time is spent on demultiplexing and remultiplexing those programs from the input stream which are intended for the output stream. Further, no additional time is spent on adjusting the timebase information for the stream. Not only is the actual remultiplexing latency decreased, but the interruption of streaming along a streaming path which will be experienced when inserting one of the inventive remultiplexers into the active streaming path is also greatly reduced, as further detailed below.

Figure 4:
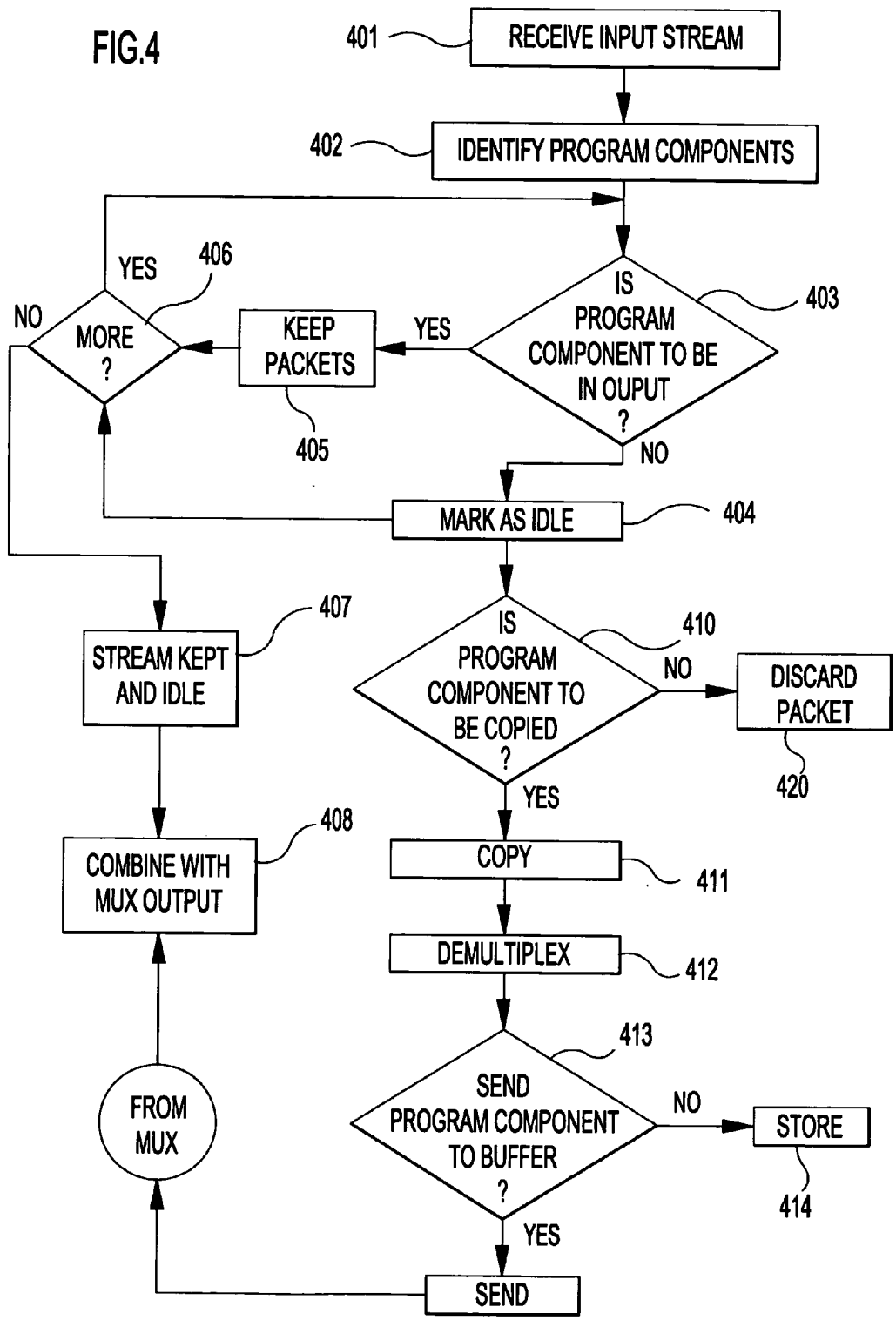
FIG. 4 provides a representative process flow for a remultiplexer in accordance with a first aspect of the present invention.

FIG. 4 provides a representative process flow for the remultiplexer of FIG. 3. Assuming that the bypass switch is open so that the input transport stream is provided to the remultiplexer, the input stream is received at the input buffer in step 401. The program components which are carried by the input stream are identified in step 402, using the program component's PID, and each program component is processed as follows. At step 403, it is determined if an identified program component is to be included in the output stream. As noted above, this determination is based on the viewer-program provider contractual relationship information which may be stored in a table. If it is determined that the identified program component is to be included in the output stream (e.g., verified that the viewer has agreed to pay for access to that program component), then the packets containing program content from the identified and verified program component are maintained, as indicated at step 405; and, if more program components in the program stream are to be evaluated, as determined at decision box 406, then the determination/verification process is repeated for the next identified program component.

If a program component is not to be included in the output stream, as determined at step 403, the packet locations in the input stream which contained program content for that program component are changed to idle packets at 404. As noted above, it is preferable to simply replace the PID for each packet with an idle packet PID at this juncture. Again, it is determined if more identified program components are to be evaluated. If the decision at 406 is that no further program components remain to be evaluated, the resulting modified input stream, comprising the packets which have been kept at 405 and the packets marked as idle packets at 404, is then streamed at 407 and combined with the output from MUX 328 at 408. It is here to be noted that the modified input stream has only been modified as to content or PID information, but not with regard to timing information. No packets have been physically removed from the input stream. The modified input stream now comprises packets having content of program components which are to pass unaltered into the output transport stream and packets which either are idle packets or are marked as idle packets. The packet replacement component will, preferably, only mark the packets as idle packets by changing the PID of such a packet to an idle PID (0x1fff) and not replacing the content thereof. At the combiner, the packets which are marked as idle packets will actually be replaced, either with packets having content of program components from the multiplexer which are to be inserted into the output transport stream or with actual idle packets, if idle packets are to be included in the output transport stream. The combiner includes an idle packet generator (not shown) which generates an idle packet that physically replaces the content of the idle packet, for which the packet replacement component had simply changed.

As for the program components which were not to be included in the output stream, the program content is evaluated to determine if the program component is to be further processed or dropped, at decision box 410. This decision may be based on provider schedules and policies, such as, for example, storing a pay per view program which will be offered to the viewer several more times during the billing period. It will be apparent to one having skill in the art that the decisions ("include in output?", "copy?", and "drop?") at the input buffer are being made on-the-fly on a packet by packet basis, and can be made in any order, provided that any necessary copy operation is made prior to a decision of whether or not to drop program components.

If the program component is to be further processed, it is copied at 411, demultiplexed at 412, sent to a program buffer at 413 for any processing (if necessary), such as watermarking or encryption, and then stored at 414. Program components which are to be further processed for provision to the output stream are copied at 411, demultiplexed at 412, and sent to a buffer such as 326 or 336 for processing prior to being multiplexed at MUX 328. Program packets which are not to be copied, as determined at 410, are discarded at 420.

Figure 1:
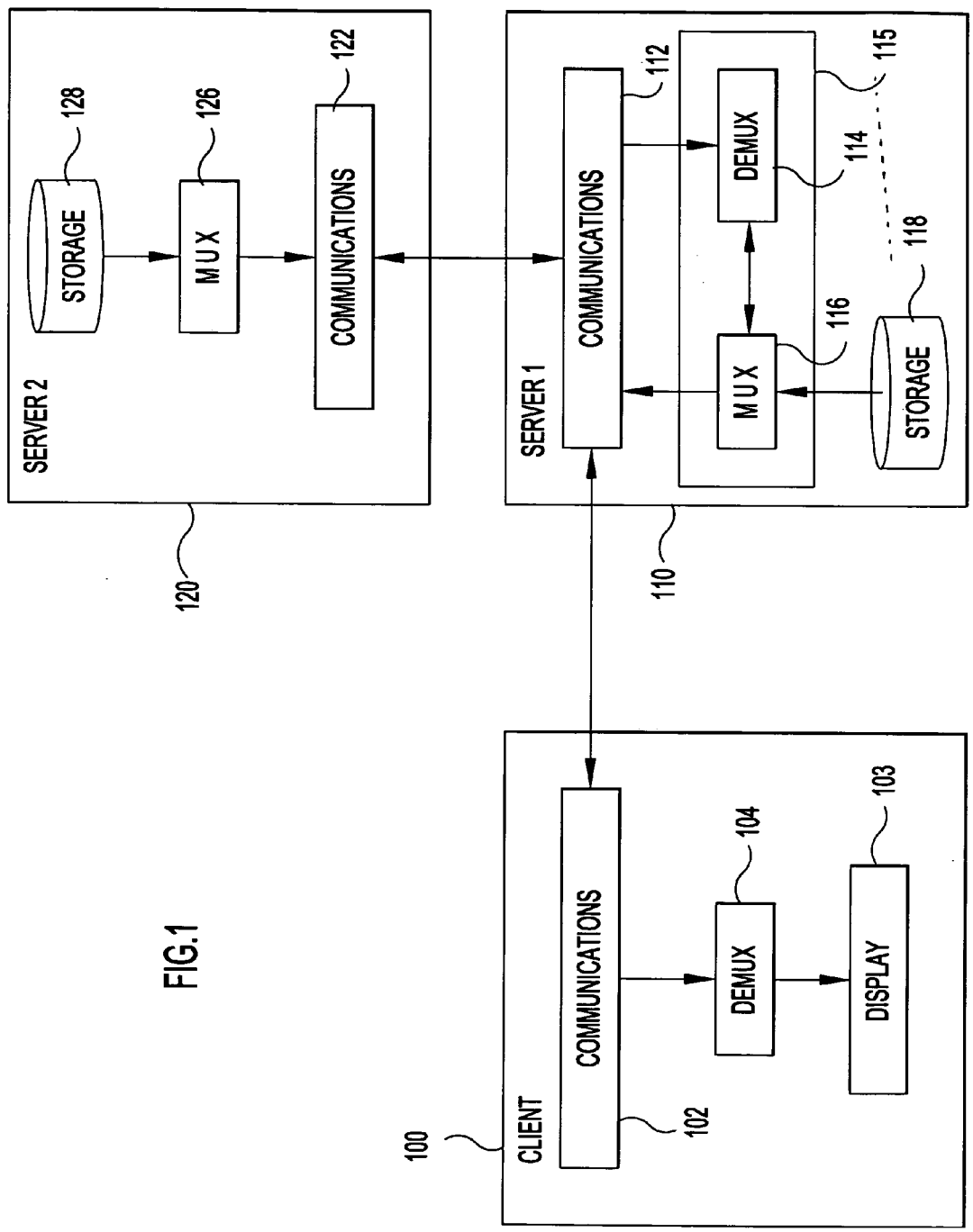
FIG. 1 is a block diagram of an environment for implementing the present invention.
Figure 2:
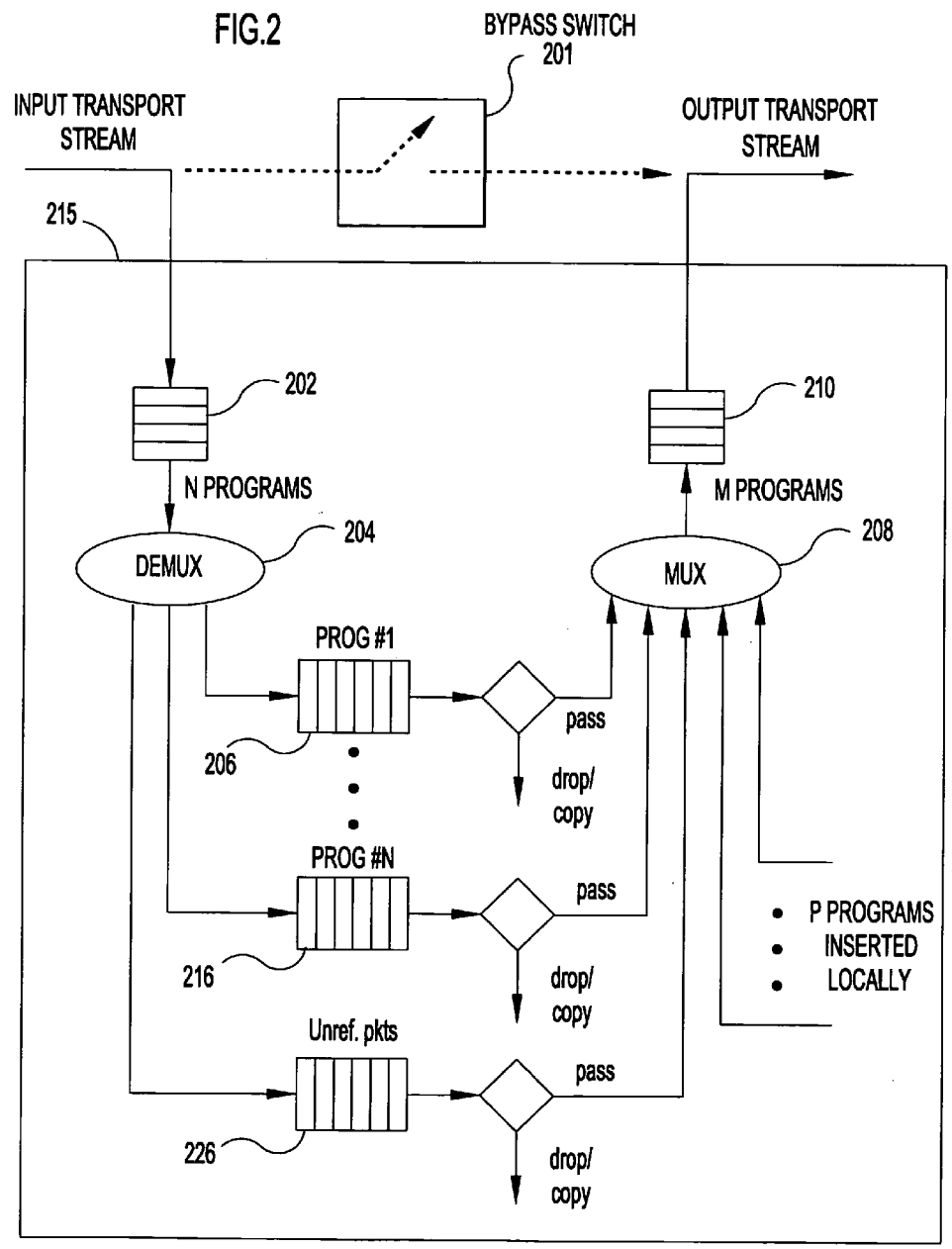
FIG. 2 is a schematic diagram of a prior art remultiplexer.

The inventive remultiplexer provides stream processing with minimal delay. In addition, the inventive remultiplexer can be introduced into an active MPEG-2 transport stream path with minimal interruption or delay. With reference to FIG. 2, a typical remultiplexer has a passive bypass device 301 that connects the input port 380 of the remultiplexer directly to its output port 390. This isolates the remultiplexer from the MPEG-2 transport path in case of an internal failure or during the power-up sequence, while maintaining an operational path. During the insertion process, the bypass device is open so that the remultiplexer becomes part of the path. The disruption caused during insertion of a remultiplexer into the MPEG-2 transport path is directly proportional to the latency within the remultiplexer itself. Accordingly, the insertion of the inventive remultiplexer illustrated in FIG. 3 causes minimal disruption with a high degree of transparency due to the low latency within the remultiplexer. The effective delay of introducing the inventive remultiplexer 315 into a transport stream is essentially the same delay as would be introduced by inserting a buffer into the stream, since buffer 302 will not send program components for demultiplexing if those program components are to be included, unaltered, in the output stream.

The insertion process for the inventive remultiplexer 315 will now be detailed with reference to FIG. 3. The input bit stream is detected by a hardware device, input buffer 302, which can copy the stream for analysis, even when the bypass switch 301 is closed, provided that insertion switch 385 is open so that no streams will pass from the remultiplexer to the output stream. It is to be noted that the bypass switch may be external to the remultiplexer, as shown, or disposed within the remultiplexer. While the bypass switch is closed, the throughput session that moves the packets from the input port to the output port is automatically initiated. The input and output ports can have different bit rates, provided that the output bit rate is at least equal to the input. All packets present in the input stream are moved to the output stream with the entire input transport stream being mapped into the output transport stream as if it contains only a single program. The packets are kept in the same sequence and relative position as they had occupied in the input stream. This feature guarantees complete transparency to any downstream devices during the insertion process.

Once the bypass switch is opened and insertion switch 385 is closed, such that the multiplexed input stream passes from the input port 380 to the remultiplexer 315 and from said remultiplexer to said output port 390, the remultiplexer initially passes all program components from said remultiplexer to the output port. The input buffer 302 gathers PID information from the stream. As noted above, the input buffer 302 could have gathered PID information while bypass switch 301 was closed and insertion switch 385 was open. The input buffer logic determines which program components are to be included in the output stream based on said PID information. The input buffer then passes all program components from the input stream which are to be included unaltered in said output stream to the output buffer 310 without demultiplexing same, while and maintaining the timing information for said input stream, as detailed above by marking as idle any packets for program components which are not to be included in the output stream.

In addition to the above-detailed remultiplexer role of adding the local program components into the output stream, provided that there is adequate bandwidth available in the output stream, other functionalities of the MPEG-2 remultiplexer include the following: filtering of the input stream to remove program components which were present in the input stream either for altering, storing or dropping; replacing a specific program with another, comprising the removal, replacement with an idle packet, and then combining into an output stream with new program information in the place of the idle packets; and, modifying program components by adding, removing, or replacing data. The latter functionality, of adding, removing or replacing data in a program stream, is typically done in conjunction with the multiplexing of a stream. As detailed above, the addition or removal of packets during multiplexing, and prior to combining with the input transport stream for the present invention, changes the timebase information for the stream, a stream alteration which cannot be ignored.

Figure 5:
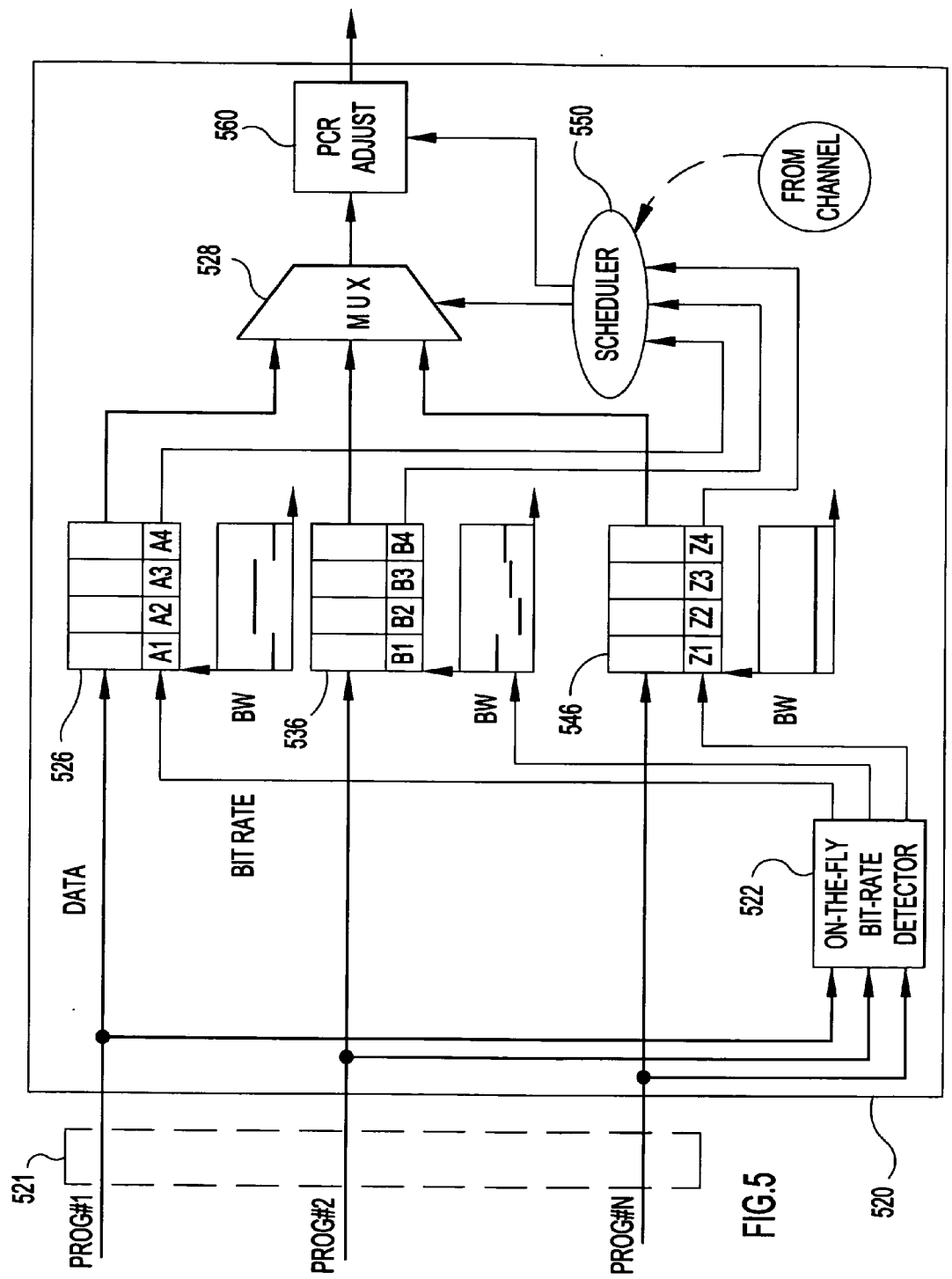
FIG. 5 illustrates a multiplexer in accordance with a second aspect of the present invention.

With reference to FIG. 5, a multiplexer implementation is illustrated which addresses the timing problems encountered by the addition or removal of packets during pre-multiplexing processing or during multiplexing. The inventive multiplexer can be incorporated with the inventive remultiplexer detailed above or can be implemented in any MPEG-2 multiplexing environment. Since the timing information which was originally part of the program may not be valid, and since a demultiplexed program can not be reconstructed without obtaining the original timing information, it is typically necessary to adjust timebase information and to provide the original timebase information for a program by a separate transmission to the demultiplexer. The inventive multiplexer is able to provide for the multiplexing of CBR and VBR streams without preprocessing of the demultiplexed programs. It also allows for the multiplexing and/or remultiplexing of program components that were partially changed without the need for adjusting the timebase information.

As depicted in FIG. 5, after the program components have been altered at the stream altering component 521, by real time insertion or removal of packets for such things as watermarking, enhanced id, interactive services, audio track removal, closed captioning, etc., the program streams are provided for processing by the inventive system, representatively shown as block 520 which is comprised of on-the-fly detector 522, program buffers 526, 536, and 546, multiplexer 528, scheduler 550 and PCR adjust component 560.

In operation, the on-the-fly detector 522 samples the altered program streams and determines the bit rate for each portion of the streams. As noted earlier, the streams may be variable bit rate (VBR), as shown in program buffers 526 and 536, or constant bit rate (CBR) streams, as shown in program buffer 546. For an unaltered CBR stream, the bit rate will not change. However, for the VBR streams, the bit rate is unpredictable. What the detector 522 does is determine the transmission bit rate of a program using the number of bytes between two consecutive PCR packets, and the difference in the time information carried by those two consecutive PCR values. The instantaneous bit rate can be determined by dividing the distance between packets by the change in time information. Clearly in a CBR stream the resulting value will always be the same for any two PCR values; but, the instantaneous bit rate for a VBR stream will vary depending upon the two PCR values.

The "bandwidth×time" graphs provided in FIG. 5 for each program buffer (526, 536, 546) illustrate the bandwidth per segment requirement for transmitting the programs A, B, and Z. As can be seen from the graphs, the bandwidth requirement will change continually for VBR programs such as programs A and B, while the bandwidth requirement for the CBR program Z is constant.

The resulting values, comprising the instantaneous bit rate required to transmit every portion of the individual programs, are provide to scheduler 550, while the program packets are provided to the multiplexer 528. At the scheduler, the bit rate can be used to detect and isolate conditions where there is not enough instantaneous bandwidth available to transmit all of the programs which are slated to be in the transport stream. The scheduler monitors the channel bandwidth for the channel over which the programs are to be transmitted. If the channel bandwidth is less than the required bit rate for transmitting all of the programs in the output transport stream, the scheduler will perform dynamic bit rate adjustment to control the amount of program information which will effectively be transmitted over the channel. Dynamic bit rate adjustment can then be used, along with multiplexing and the PCR restamping discussed below, to adjust one or more programs to make all programs fit into the output stream. The dynamic bit rate adjustment can be a time shifting, which shifts when particular program content packets can be transmitted, as performed by the multiplexer 528 based on the output provided from scheduler 550. The time shift approach is lossless but may require a PCR restamping if the shifted packet contains PCR information. An alternative approach to dynamic bit rate adjustment is frame replacement, which is a lossy approach. If dynamic bit rate adjustment is not enough to fit all requested programs in the total available bandwidth, selected frames can be dropped or replaced on one or more programs based on scheduler output provided to the stream altering component 521. Using whatever approach has been predetermined, the scheduler 550 provides a signal to the multiplexer instructing it how to treat the program packets to most effectively make use of the available bandwidth.

At the same time, the scheduler 550 provides a signal to the PCR adjust component 560. Since the scheduler signal may require delaying of at least one packet, and since the delayed packet(s) may be carrying PCR information, it is necessary to adjust the PCR information for each program in the transport stream that has been affected by the scheduling change. Accordingly, the PCR adjust component 560 will restamp packets with timing information to eliminate the PCR problem.

Figure 6:
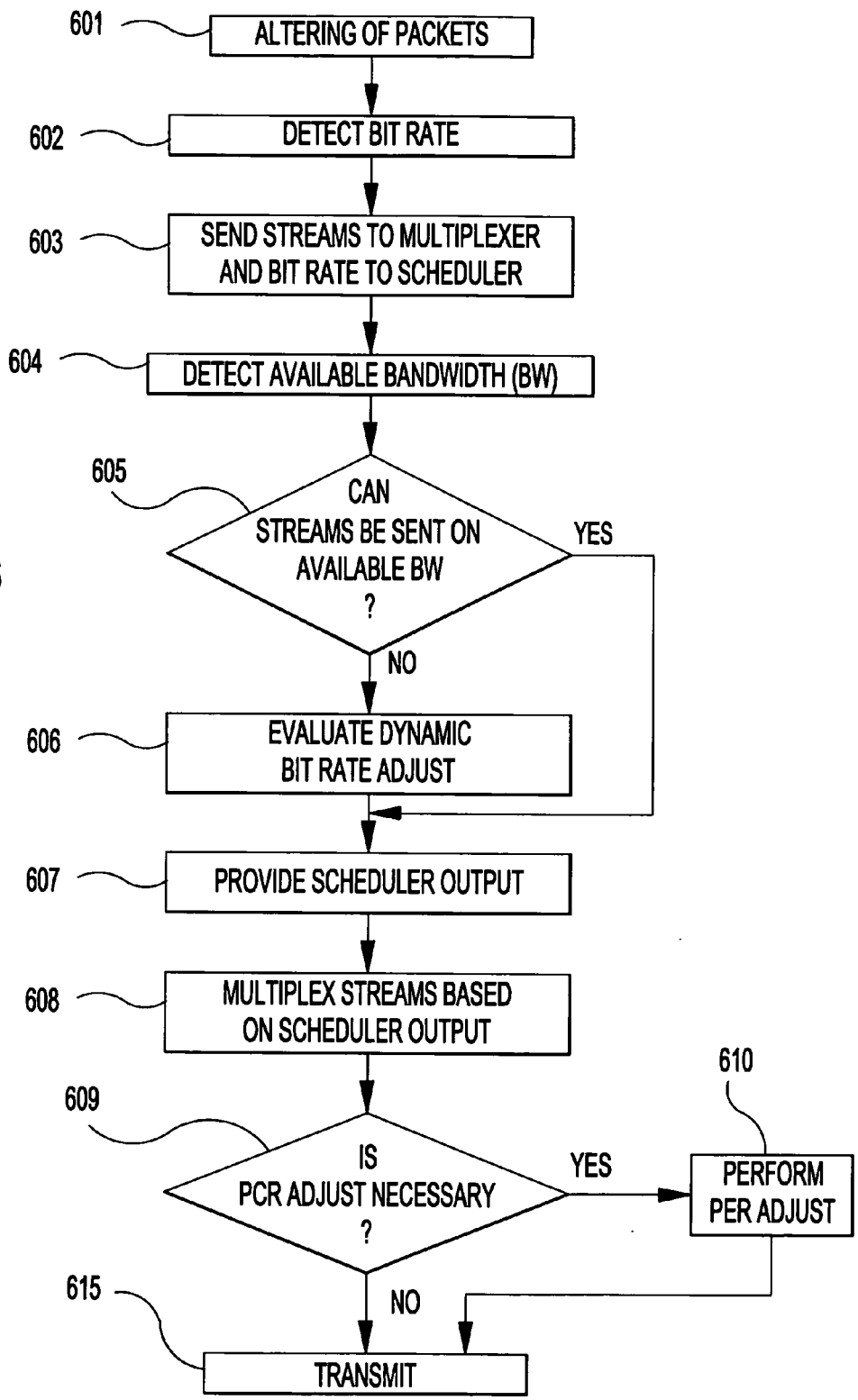
FIG. 6 provides a representative process flow for a multiplexer in accordance with a second aspect of the present invention.

FIG. 6 provides a representative process flow for the multiplexing of the present invention. After insertion or removal of packets at 601, if such treatment is necessary, the bit rate is detected at the on-the-fly bit rate detector in step 602. Thereafter, the program streams are provided to the multiplexer while the bit rates are provided to the scheduler in step 603. At the scheduler, the channel bandwidth is detected at 604 and a determination is made, based on the channel bandwidth and the bit rates, whether all of the program streams can be sent over the available streams without adjustment, shown at decision box 605. If the channel bandwidth is sufficient, the process continues at 607. If, however, the bandwidth is not sufficient, the scheduler evaluates the options for dynamic bit rate adjustment at 606 and provides its output to both the multiplexer and the PCR adjust at step 607. Note that the scheduler output is shown as being provided even in the event that no dynamic bit rate adjustment is required. Clearly modifications can be made to the process, such as not generating any scheduler output to stream adjust component 521 when the bandwidth is determined to be sufficient, while still achieving the same functionality.

At 608, the multiplexer multiplexes the streams into an output transport stream, based on any scheduler output for dynamic bit rate adjustment as needed. At step 609, it is determined if PCR adjustment is required due to any dynamic bit rate adjustment. If no PCR adjustment is necessary, either due to the fact that bandwidth is sufficient, or that no PCR information is being compromised, the process proceeds to transmitting at step 615. If, however, PCR adjustment is required, it is undertaken at step 610, after which the stream is transmitted at 615.

In an implementation wherein a modified input stream and a multiplexed stream which has been multiplexed by the inventive multiplexer depicted in FIG. 5 are to be combined into an output stream, the scheduler may evaluate both the bandwidth available in the modified input stream as well as the channel bandwidth for transmission of the output transport stream. Moreover, the PCR adjustment can be made on the combined output transport stream, rather than only on the multiplexed stream.

The invention has been described with reference to several specific embodiments. One having skill in the relevant art will recognize that modifications may be made without departing from the spirit and scope of the invention as set forth in the appended claims.

Having thus described our invention, what is claimed is:

1. Remultiplexer apparatus for processing multimedia input streams comprising:
    a demultiplexer component for demultiplexing program streams;
    at least one input buffer for receiving an input stream comprising more than one program, each program having a plurality of program components each having an associated packet identifier (PID), said at least one input buffer comprising:
        an identifier for identifying a program component based on the PID for the program component;
        a determining means for determining whether an identified program component is to be included unaltered in a remultiplexer output stream, is to be dropped, or is to be copied for further processing;
        a packet replacement component for marking packets in the input stream containing program component content not to be included in the remultiplexer output stream as idle packets thereby producing a modified input stream whereby said packet replacement component changes only the PID for each packet in the input stream containing program component content not to be included in the remultiplexer output stream to indicate that the packet is an idle packet which can be replaced; and
        a buffer for providing said modified input stream for output, for discarding program components to be dropped, and for copying program components to be further processed;
    a multiplexer for multiplexing local program components for inclusion in said remultiplexer output stream into a multiplexed stream; and
    a combiner for combining said multiplexed stream with said modified input stream to produce said remultiplexer output stream.

2. The remultiplexer apparatus of claim 1 wherein said combiner is adapted to replace the content of idle packets of said modified input stream with content of said multiplexed stream.

3. The remultiplexer apparatus of claim 2 wherein said input stream additionally comprises unreferenced packets which contain content other than program component content and wherein said packet replacement component maintains the relative timing position of said unreferenced packets in said modified input stream.

4. The remultiplexer apparatus of claim 1 wherein said determining means performs said determining based on stored information regarding user program access.

5. The remultiplexer apparatus of claim 1 wherein said further processing of program components comprises storage, said apparatus further comprising program storage for storing input program component at said remultiplexer.

6. An input buffer for a remultiplexer comprising:
    receiving means for receiving an input stream comprised of more than one program, each program comprising a plurality of program components, each having an associated packet identifier (PID);
    identifier means for identifying a program component based on the PID for said program component;
    determining means for determining whether an identified program component is to be included unaltered in a remultiplexer output stream, is to be dropped, or is to be copied for further processing;
    packet replacement means for marking packets in the input stream containing program component content not to be included in the remultiplexer output stream as idle packets thereby producing a modified input stream, wherein said packet replacement component changes only the PID for each packet in the input stream containing program component content not to be included in the remultiplexer output stream to indicate that the packet is an idle packet which can be replaced; and
    buffer means for providing said modified input stream for output, for discarding program components to be dropped, and for copying program components to be further processed.

7. The input buffer of claim 6 wherein said input stream additionally comprises unreferenced packets which contain content other than program component content and wherein said packet replacement component maintains the relative timing position of said unreferenced packets in said modified input stream.

8. The input buffer of claim 6 wherein said determining means performs said determining based on stored information regarding user program access.

9. A method for processing multiplexed multimedia input streams comprising the steps of:
receiving an input stream comprised of more than one program, each program having a plurality of program components each having an associated packet identifier (PID);
identifying a program component based on the PID for the program component;
determining whether an identified program component is to be included unaltered in an output transport stream, is to be dropped, or is to be copied for further processing;
marking packets in the input stream containing program component content not to be included in the output stream as idle packets by changing only the PID for each packet in the input stream containing program component content not to be included in the output stream to indicate that the packet is an idle packet which can be replaced, thereby producing a modified input stream; and
copying program components to be further processed.

10. The method of claim 9 further comprising the step of demultiplexing said program components to be further processed.

11. The method of claim 10 wherein said further processing comprises storing said demultiplexed program components.

12. The method of claim 10 wherein said further processing comprises altering said program components for inclusion in the output transport stream.

13. The method of claim 12 further comprising multiplexing at least said altered program components into a multiplexed stream.

14. The method of claim 13 further comprising combining said modified input stream and said multiplexed stream to produce the output transport stream.

15. The method of claim 13 wherein said multiplexing comprises the steps of:
dynamically determining the instantaneous bit rate of program streams;
multiplexing program streams to produce an output transport stream;
determining channel bandwidth for said output transport stream;
performing dynamic bit rate adjustment based on said channel bandwidth and said instantaneous bit rates; and
time stamping the output transport stream based on said dynamic bit rate adjustment.

16. A method for inserting a remultiplexer into an active transport stream, comprising a multiplexed input stream having packets from more than one program, each program having a plurality of program components with an associated packet identifier (PID), wherein a bypass switch is provided between an input port and an output port for said stream, comprising the steps of:
connecting said remultiplexer between said input port and said output port;
opening said bypass switch whereby said multiplexed input stream passes from said input port to said remultiplexer and from said remultiplexer to said output port;
initially passing all program components from said remultiplexer to said output port;
gathering PID information from said stream;
determining which program components are to be included in said output stream based on said PID information;
passing all program components from said input stream which are to be included unaltered in said output stream without demultiplexing same; and
maintaining the timing information for said input stream and changing only the PID for each packet in the input stream containing program components not to be included in the output stream to indicate that the packet is an idle packet which can be replaced.

17. The method of claim 16 further comprising the step of demultiplexing said program components to be further processed.

18. The method of claim 17 wherein said further processing comprises storing said demultiplexed program components.

19. The method of claim 17 wherein said further processing comprises altering said program components for inclusion in the output transport stream.

20. The method of claim 19 further comprising multiplexing at least said altered program components into a multiplexed stream.

21. The method of claim 20 further comprising combining said modified input stream and said multiplexed stream to produce the output transport stream.

22. The method of claim 20 wherein said multiplexing comprises the steps of:
dynamically determining the instantaneous bit rate of program streams;
multiplexing program streams to produce an output transport stream;
determining channel bandwidth for said output transport stream;
performing dynamic bit rate adjustment based on said channel bandwidth and said instantaneous bit rates; and
time stamping the output transport stream based on said dynamic bit rate adjustment.

23. Remultiplexer apparatus for processing multimedia input streams comprising:
a demultiplexer component for demultiplexing program streams;
at least one input buffer for receiving an input stream comprising more than one program, each program having a plurality of program components each having an associated packet identifier (PID), said at least one input buffer comprising:
an identifier for identifying a program component based on the PID for the program component;
a determining means for determining whether an identified program component is to be included unaltered in an output stream, is to be dropped, or is to be copied for further processing;
a packet replacement component for marking packets in the input stream containing program component content not to be included in the output stream as idle packets wherein said packet replacement component changes only the PID for each packet in the input stream containing program component content not to be included in the remultiplexer output stream to indicate that the packet is an idle packet which can be replaced thereby producing a modified input stream; and a buffer for providing said modified input stream for output, for discarding program components to be dropped, and for copying program components to be further processed;

a dynamic bit rate detector for determining the instantaneous bit rate of program streams;

a multiplexer for multiplexing program streams to produce a multiplexed stream;

a combiner for combining said multiplexed stream with said modified input stream to produce said output stream;

a scheduler for determining available bandwidth, for evaluating dynamic bit rate adjustment based on said available bandwidth and said instantaneous bit rates, and for providing a scheduler output for dynamic bit rate adjustment when producing at least one of said multiplexed stream and said output stream; and a PCR adjust component for time stamping at least one of said multiplexed stream and said output stream based on said scheduler output.

* * * * *